(12) United States Patent
Fung et al.

(10) Patent No.: US 6,580,384 B1
(45) Date of Patent: Jun. 17, 2003

(54) TRACK PREDICTION METHOD IN COMBINED RADAR AND ADS SURVEILLANCE ENVIRONMENT

(75) Inventors: Youn-Tih Fung, Taipei (TW); Wu-Ja Lin, Taipei (TW); Yeong-Shiou Hsiao, Taipei (TW)

(73) Assignee: Institute for Information Industry, Taipei (TW)

( * ) Notice: Subject to any disclaimer, the term of this patent is extended or adjusted under 35 U.S.C. 154(b) by 0 days.

(21) Appl. No.: 10/026,650

(22) Filed: Dec. 27, 2001

(51) Int. Cl.[7] .................. G01S 13/00; G01C 12/26; G01C 21/28; G01C 21/30; G01C 21/32; G01C 21/34; G01C 21/36
(52) U.S. Cl. .................. 342/36; 701/201; 701/206
(58) Field of Search .................. 342/36, 37, 38, 342/39, 40; 701/201, 206

(56) References Cited

U.S. PATENT DOCUMENTS

| | | | | |
|---|---|---|---|---|
| 4,179,696 A | * | 12/1979 | Quesinberry et al. | ....... 235/412 |
| 5,596,332 A | * | 1/1997 | Coles et al. | ................ 342/455 |
| 6,148,259 A | * | 11/2000 | Hagelauer | ................... 701/122 |
| 6,269,301 B1 | * | 7/2001 | Deker | ........................ 701/206 |

* cited by examiner

Primary Examiner—Thomas H. Tarcza
Assistant Examiner—Brian Andrea
(74) Attorney, Agent, or Firm—Bacon & Thomas, PLLC

(57) ABSTRACT

A track position prediction method used in combined radar and ADS surveillance environment is disclosed. Since the time interval between two successive ADS-A reports is too long, air traffic control system must be able to predict aircraft position within this time interval to increase safety. The present invention provides a way to satisfy this requirement.

8 Claims, 1 Drawing Sheet

TRACK PREDICTION METHOD IN COMBINED RADAR AND ADS SURVEILLANCE ENVIRONMENT

BACKGROUND OF THE INVENTION

1. Field of the Invention

The present invention can be classified to air traffic control, and particularly to a track prediction method in combined radar and ADS surveillance environment.

2. Description of the Related Art

As air traffic grows rapidly (about 10% per year), current air traffic control system cannot handle it efficiently. To solve the accompanying problems, e.g., rising operational cost and arrival time delay, the International Civil Aircraft Organization (ICAO) established a FANS (Future Air Navigation Systems) committee to study and propose new techniques. FANS proposed new Communication, Navigation, Surveillance (CNS) techniques in 1991 to support future Air Traffic Management (ATM). Among these techniques, ADS-A (Automatic Dependent Surveillance-Addressing) and ADS-B (Automatic Dependent Surveillance-Broadcast) are new techniques for Surveillance.

Since the time interval between two successive ADS-A reports is too long (about 15 to 30 minutes in average), current air traffic control system must be able to predict ADS-A equipped aircraft position in future combined radar and ADS surveillance environment to increase safety. The present invention provides a way to satisfy this requirement.

SUMMARY OF THE INVENTION

The object of the present invention is to provide a track position prediction method in combined radar and ADS surveillance environment. The proposed method uses Kalman filter to predict the aircraft position when it receives radar reports. If only ADS-A reports of an aircraft are received, the proposed method use (A)–(F) to predict this aircraft's position: (A) suppose an aircraft is at position $P_0$, request the aircraft to report its next two way-points $P_1$ and $P_2$. (B) Select turning points $Q_1$ from $\overline{P_0P_1}$ and $Q_2$ from $\overline{P_1P_2}$; the length of $\overline{P_1Q_1}$, is equal to that of $\overline{P_1Q_2}$. (C) At the bisector of $\overline{Q_1Q_2}$, select various dividing points $c_i$ ($i=1, \ldots$ g). (D) Use $Q_1$, $Q_2$, slop of $\overline{Q_1C_i}$, and slope of $\overline{C_iQ_2}$, plot Hermite curves $T_i$ connecting $Q_1$ and $Q_2$. (E) The predicted aircraft positions are $\overline{P_0Q_1}$, $T_d$, $\overline{Q_2P_2}$, where $d\epsilon[1,g]$ is pre-determined by the controller. (F) If an ADS-A report is received before the aircraft passes through $P_2$, the predicted positions will be adjusted accordingly.

The various objects and advantages of the present invention will be readily understood in the following detailed description.

DETAILED DESCRIPTION OF THE PREFERRED EMBODIMENT

Figure 1:
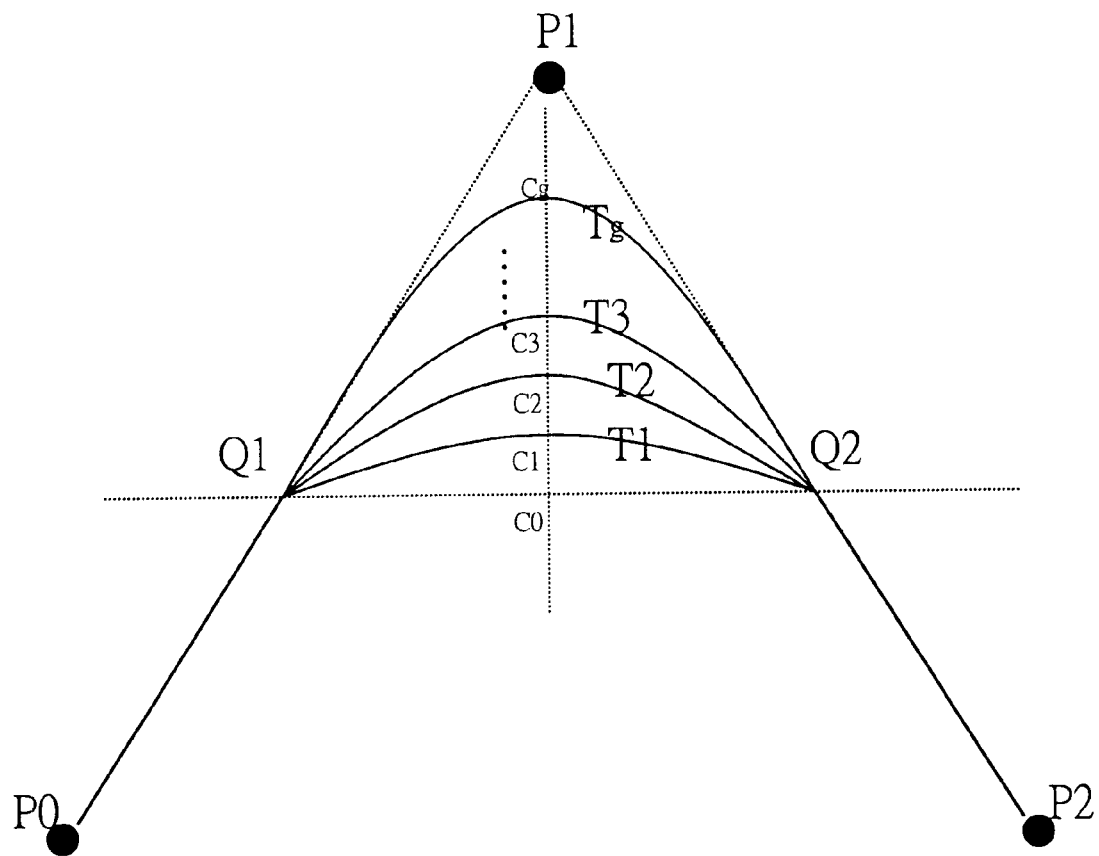
FIG. 1 illustrates the curves, points used in the present invention on predicting the aircraft's position.

The following definitions are used in the present invention.

- $P_0$ is current position of an ADS-A-equipped aircraft. $P_1$ and $P_2$ are way points to be passed through by this aircraft.
- $Q_1$ and $Q_2$ are turning points selected by air traffic controller.
- $\overline{P_1C_0}$ bisects $\overline{Q_1Q_2}$,
- $C_0, C_1, \ldots, C_g$ divides $\overline{P_1C_0}$ equally.
- $\nabla t$ is the time interval between two successive positions prediction.
- $P=(x_p,y_p)$ is last predicted aircraft position.
- $S=\sqrt{S_x^2+S_y^2}$ is aircraft speed reported by ADS-A (or is calculated based on previous reports), where $S_x$ and $S_y$ are speeds in x direction and y direction.
- $\vec{r_{1i}}$ are vectors connecting $Q_1$ and $C_i$, and $\vec{r_{i2}}$ are vectors connecting $C_i$ and $Q_2$.
- $f_i(t)$ are Hermite curves connecting $Q_1$ and $Q_2$ with tangent vectors $\vec{r_{1i}}$ on $Q_1$ and $\vec{r_{i2}}$ on $Q_2$.
- $f_d(t)$ is the default Hermite curve used for prediction. It connects $Q_1$ and $Q_2$ with tangent vectors $\vec{r_{1d}}$ and $\vec{r_{d2}}$; $\vec{r_{1d}}$ and $\vec{r_{d2}}$ are vectors connecting $\{Q_1, C_d\}$ and $\{C_d, Q_2\}$, where $d\epsilon[1,g]$ is chosen by controllers.

$$T = \frac{2 \cdot \overline{Q_1 C_d}}{S}$$

is the approximated time to fly from $Q_1$ to $Q_2$.

The track prediction method proposed in the present invention is described in the following.

1. If an aircraft is tracked by primary, secondary radars and ADS-B, the Kalman filter is used to predict the track's position. If the aircraft is tracked only by ADS-A, use the following steps to predict the track's position.

2. Suppose an aircraft is expected to appear within $\overline{P_0Q_1}$ or $\overline{Q_2P_2}$, the aircraft's position is predicted by a straight line, $$P'=(x_p+S_x \cdot \nabla t,\ y_p+S_y \cdot \nabla t). \tag{1}$$

Note that an aircraft is expected to appear in $\overline{P_0Q_1}$ if $\|\overline{PQ_1}\| \geq \nabla t \cdot S$.

3. If an aircraft is expected to appear between $Q_1$ and $Q_2$, a Hermite curve is used to predicted the aircraft position. We discuss various possible cases in the following, Case 1: The aircraft is flying across $Q_1$, i.e., $\|\overline{PQ_1}\| < \nabla t \cdot S$:

$$\text{let } \nabla t_1 = \nabla t - \frac{\overline{PQ_1}}{S},\ t_0 = \frac{\nabla t_1 \cdot S}{2 \cdot \overline{Q_1 C_d}} = \frac{\nabla t_1}{T},$$

the predicted position $$P'=f_d(t_0) \tag{2}$$

Case 2: The aircraft's position is between $Q_1$ and $Q_2$, i.e., $\nabla t_1 + k \cdot \nabla t < T,\ k=1,2,\ldots,$ If no ADS report is received in this period, Let $$t_k = \frac{\nabla t_1 + k \cdot \nabla t}{T},$$

the predicted aircraft position is $$P'=f_d(t_k), \tag{3}$$

A new ADS-A report is received at time $t_r$ and the reported position $D_r$ is:

(A) between $f_{m-1}(t_{k'})$ and $f_m(t_{k'})$, where $1<m\leq g$, $$t_{k-1} \leq t_{k'} = \frac{t_r - t_s}{T} \leq t_k,$$

$t_s$ is the time at which the aircraft passes through $Q_1$, and $\nabla t=(t_k-t_{k-1})*T$. Let $d_{m-1}=\|D_t-f_{m-1}(t_{k'})\|$, $d_m=\|D_t-f_m(t_{k'})\|$, and $W=d_{m-1}+d_m$, the predicted aircraft position is $$P' = \frac{d_m}{W} f_{m-1}(t_k) + \frac{d_{m-1}}{W} f_m(t_k). \quad (4)$$

(B) at or above $f_g(t_k)$, the predicted aircraft position is $$P'=f_g(t_k). \quad (5)$$

(C) at or below $f_1(t_k)$, the predicted aircraft position is $$P'=f_1(t_k). \quad (6)$$

Case 3: The aircraft is expected to fly across $Q_2$, i.e., $\nabla t_1+k\cdot\nabla t>T$.

Let $\nabla t_2=\nabla t_1+k\cdot\nabla t-T$, the predicted aircraft position is $$P'=(x_{Q_2}+S_x\cdot\nabla t_2, y_{Q_2}+S_y\cdot\nabla t_2), \quad (7)$$

where $Q_2=(x_{Q_2}, y_{Q_2})$.

Using Steps 1 to 3 described above, the present invention provides a way to predict aircraft's position in the time interval between two successive ADS-A reports. Moreover, when the aircraft makes a new ADS-A report, the predicted position can be adjusted accordingly to increase the accuracy of the prediction.

Although the present invention has been explained in relation to its preferred embodiment, it is to be understood that many other possible modifications and variations can be made without departing from the spirit and scope of the invention as hereinafter claimed.

What is claimed is:

1. A track position prediction method in a combined radar and ADS surveillance environment in which an aircraft is tracked by ADS-A, comprising the steps of:

(A) requesting, when an aircraft is at position P0, the aircraft to report two way-points P1 and P2 that are generated by ADS-A equipment on the aircraft, and that the ADS-A equipment on the aircraft predicts will be passed through;

(B) selecting a first turning point Q1 within $\overline{P_0P_1}$ and selecting a second turning point Q2 within $\overline{P_1P_2}$; wherein the length of $\overline{P_1Q_1}$ is equal to that of $\overline{P_1Q_2}$;

(C) selecting, at the bisector of $\overline{Q_1Q_2}$, various dividing points Ci (i=1, . . . g);

D) using Q1, Q2, $\vec{r}_{1i}$, $\vec{r}_{i2}$ to plot Hermite curves T1 connecting Q1 and Q2, where $\vec{r}_{1i}$ are vectors connecting Q1 and Ci, and $\vec{r}_{i2}$ are vectors connecting Ci and Q2;

(E) predicting the aircraft positions to be $\overline{P_0Q_1}$, Td, and $\overline{Q_2P_2}$ if there is no ADS-A report is received before the aircraft passes through $P_2$, where d∈[1,g] is predetermined by an air traffic control operator; and (F) adjusting the predicted aircraft position if an ADS-A report is received before the aircraft passes through P2.

2. The method in claim 1, when the aircraft is expected to appear within $\overline{P_0Q_1}$ or $\overline{Q_2P_2}$, use formula $P'=(x_p+S_x\cdot\nabla t, y_p+S_y\cdot\nabla t)$ to predict aircraft position, where $S_x$ and $S_y$ denote speeds in x and y directions.

3. The method in claim 1, when the aircraft is expected to fly across $Q_1$, uses formula $P'=f_d(t_0)$ to predict aircraft position, where $$t_0 = \frac{\nabla t_1 \cdot S}{2 \cdot Q_1 C_d} = \frac{\nabla t_1}{T}, \nabla t_1 = \nabla t - \frac{\overline{PQ_1}}{S},$$

$f_d(t)$ is a Hermite curve, and d is chosen by the controller.

4. The method in claim 1, when the aircraft is expected to appear between $Q_1$ and $Q_2$ and no ADS-A report is received, uses formula $P'=f_d(t_k)$ to predict aircraft position, where $$t_k = \frac{\nabla t_1 + k\cdot\nabla t}{T}, \nabla t_1 = \nabla t - \frac{\overline{PQ_1}}{S},$$

k=1,2 . . .

5. The method in claim 1, when a new ADS-A report is received at time $t_r$ and the position $D_t$ is between $f_{m-1}(t_{k'})$ and $f_m(t_{k'})$, uses formula $$P' = \frac{d_m}{W} f_{m-1}(t_k) + \frac{d_{m-1}}{W} f_m(t_k)$$

to predict aircraft position, where $1<m\leq g$, $$t_{k-1} \leq t_{k'} = \frac{t_r - t_s}{T} \leq t_k,$$

$t_s$ is the time that the aircraft flies through $Q_1$, $\nabla t=(t_k-t_{k-1})*T$, $d_{m-1}=\|D_t-f_{m-1}(t_{k'})\|$, $d_m=\|D_t-f_m(t_{k'})\|$ and $W=d_{m-1}+d_m$.

6. The method in claim 1, when a new ADS-A report is received and the position is at or above $f_g(t_k)$, uses formula $P'=f_g(t_k)$ to predict aircraft position.

7. The method in claim 1, when a new ADS-A report is received and the position is at or below $f_1(t_k)$, uses formula $P'=f_1(t_k)$ to predict aircraft position.

8. The method in claim 1, when the aircraft is expected to fly through $Q_2$, uses formula $P'=(x_{Q_2}+S_x\cdot\nabla t_2, y_{Q_2}+S_y\cdot\nabla t_2)$ to predict aircraft position, where $\nabla t_2=\nabla t_1+k\cdot\nabla t-T$, $$\nabla t_1 = \nabla t - \frac{\overline{PQ_1}}{S},$$

and $Q_2=(x_{Q_2}, y_{Q_2})$.

* * * * *